(No Model.)
C. C. MARTIN.
SELF SETTING ANIMAL TRAP.
No. 504,811. Patented Sept. 12, 1893.
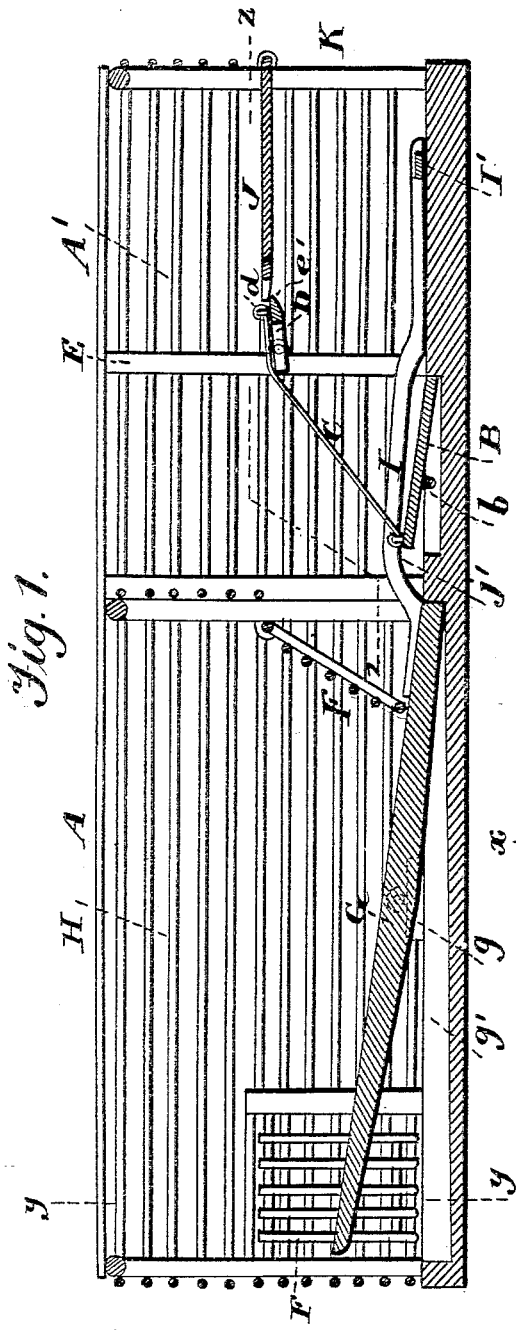
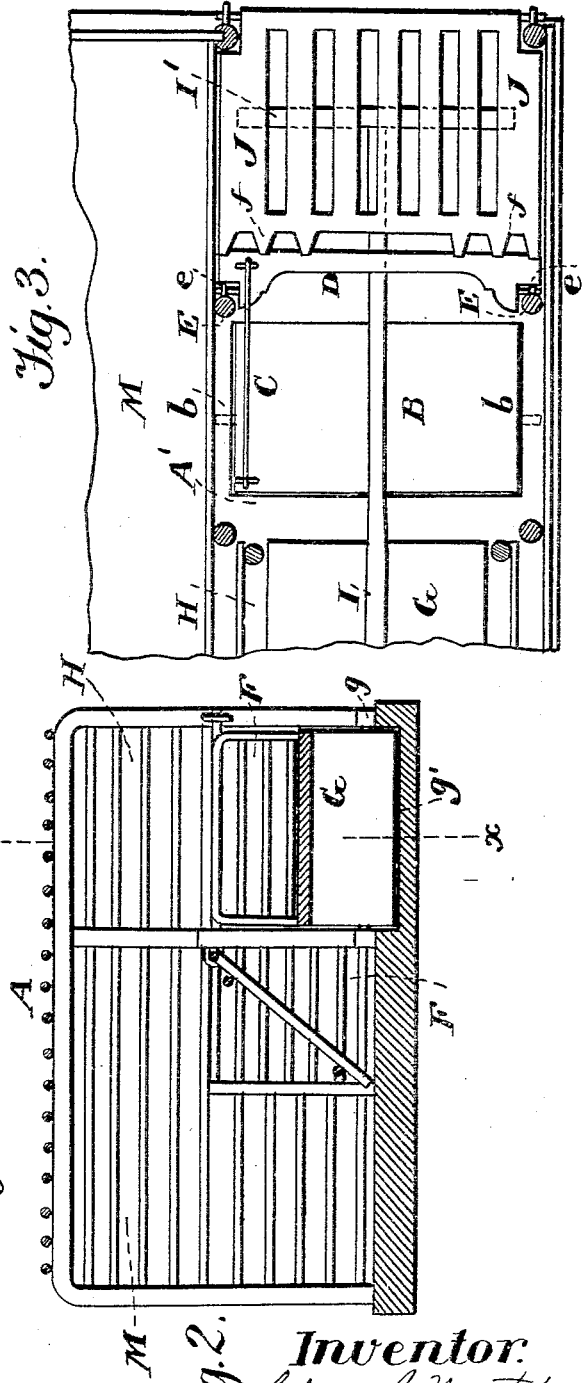
Witnesses.
A. Ruppert.
E. S. Trull
Inventor.
Charles C. Martin,
by Franklin H. Hough,
his Atty.

UNITED STATES PATENT OFFICE.

CHARLES C. MARTIN, OF WEST FRANKLIN, INDIANA, ASSIGNOR OF ONE-HALF TO ALBERT J. SCHLAFFER, OF SAME PLACE.

SELF-SETTING ANIMAL-TRAP.

SPECIFICATION forming part of Letters Patent No. 504,811, dated September 12, 1893.

Application filed March 17, 1893. Serial No. 466,475. (No model.)

*To all whom it may concern:*

Be it known that I, CHARLES C. MARTIN, a citizen of the United States, residing at West Franklin, in the county of Posey and State of Indiana, have invented certain new and useful Improvements in Self-Setting Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in animal traps, and especially to the class known as self-setting, traps and aims to provide a trap which will be simple in construction and of easy operation, and provide room for imprisoning a large number of animals.

The invention consists further in the novel construction, combination and adaptation of the parts as will be hereinafter more fully described, and then specifically defined in the appended claim.

The invention is clearly illustrated in the accompanying drawings, which with the letters of reference marked thereon form a part of this specification, like letters of reference indicating like parts throughout the several views, in which—

Figure 1, is a longitudinal, vertical section taken upon the line *x*, *x*, of Fig. 2. Fig. 2, is a transverse section on the line *y*, *y* of Fig. 1. Fig. 3, is a horizontal section taken upon the line *z*, *z* of Fig. 1.

Reference now being had to the drawings by letter, A. represents a framework made preferably of wire or other metal, and is divided up in to compartments A' being the first compartment where the animal enters, and in which is contained the tripping platform B, which is suitably pivoted in a depression in the floor of the cage as shown at *b*, *b*, so as to allow of its being tilted by the slightest weight coming in contact with the platform. To one side of the trip platform is an eye to which is attached a rod C said rod running to the releasing lever D, and secured to an eye *d* on said lever. This releasing lever D is pivoted to opposite posts E of the frame in the bearings *e e*, and has a beveled edge *e'*.

F. F. are doors pivoted between opposite posts at the entrances of the different compartments, and remain normally in a closed position by reason of gravity. G is a platform pivoted to the blocks *g*, *g*, at the sides of the compartment H and is depression *g'* in the compartment H and is bent as shown. To one end of the tilting platform or re-setting device, is attached the extension I, having a T-shaped bar at its free end, as shown at I'. This extension passes under the pivoted door J, over the tripping platform B, said extension being curved and cut away as seen at *j'*, to allow the platform B to tilt readily, and extends under the door at the entrance of the cage proper.

The operation of my improved trap will be readily understood, and is as follows. The animal enters at the opening K, the trap being in a set position, and when the animal comes in contact with the tripping platform B, the latter tilts, and the lever D is caused to be raised slightly through the medium of the rod C attached one end to the tripping platform and the other to the lever D, this allows the pivoted door to fall by gravity and thus imprisons the victim. The animal now entrapped, finding no means of retreat will pass through into compartment H by raising the door pivoted between the two adjoining compartments, and when once through the animal is cut off from retreat, and in its endeavor to escape passes up the tilting, or re-setting platform, which by the weight of the animal tilts, the T-shaped extension I' and raises the door pivoted over the main entrance, the projections *f* abut against the beveled side of the lever D and raise said lever until the projections are cleared, the lever falls back by gravity and presents its edge to catch and hold the door open ready for the next victim.

It will be seen that all of the compartments are provided with pivoted doors which open in one direction only and that when the animal gets through into a compartment, all retreat is cut off, and the animal at last comes into the general compartment M.

Having thus described my invention, what

I claim to be new, and desire to secure by Letters Patent, is—

The combination with the cage, of a tripping platform pivoted therein, a releasing lever pivoted on a higher plane and connected with said platform, the pivoted doors, the resetting pivoted platform, and an extension thereon passed over the tilting platform, and the pivoted door J above said extension and supported on the releasing lever, said extension being curved and cut away to allow the tilting platform to tilt, substantially as shown and described.

In testimony whereof I affix my signature in presence of two witnesses.

CHARLES C. MARTIN.

Witnesses:
JAMES L. CABANS,
HARRY DAVID.